(12) United States Patent
Haghighi et al.

(10) Patent No.: US 10,520,586 B2
(45) Date of Patent: *Dec. 31, 2019

(54) SYSTEM FOR GENERATING VIRTUAL RADAR SIGNATURES

(71) Applicant: UniqueSec AB, Hovås (SE)

(72) Inventors: Kasra Haghighi, Hovås (SE); Fahimeh Rafieinia, Askim (SE)

(73) Assignee: UniqueSec AB, Hovas (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/523,488

(22) PCT Filed: Oct. 21, 2016

(86) PCT No.: PCT/SE2016/051031
§ 371 (c)(1),
(2) Date: May 1, 2017

(87) PCT Pub. No.: WO2017/069695
PCT Pub. Date: Apr. 27, 2017

(65) Prior Publication Data
US 2017/0307732 A1    Oct. 26, 2017

(30) Foreign Application Priority Data
Oct. 22, 2015   (SE) ...................... 1551370

(51) Int. Cl.
*G01S 7/40* (2006.01)

(52) U.S. Cl.
CPC .......... *G01S 7/4056* (2013.01); *G01S 7/4052* (2013.01); *G01S 13/931* (2013.01); *G01S 2007/4082* (2013.01)

(58) Field of Classification Search
CPC ............................ G01S 7/4056; G01S 13/931
See application file for complete search history.

(56) References Cited

U.S. PATENT DOCUMENTS

| 4,621,265 A | 11/1986 | Buse et al. |
| 4,768,091 A | 8/1988 | Pooler et al. |

(Continued)

FOREIGN PATENT DOCUMENTS

| CN | 102565781 | 7/2012 |
| CN | 104614713 | 5/2015 |

(Continued)

OTHER PUBLICATIONS

Henna Perälä et al, On Efficient Characterization of Radar Targets with Scatterer Sets for Target Recognition Using Commercial Ray Tracing Software, pp. 0260-0264, 2014, IEEE.

(Continued)

*Primary Examiner* — Marcus E Windrich
(74) *Attorney, Agent, or Firm* — Renner, Otto, Boisselle & Sklar, LLP

(57) ABSTRACT

The invention relates to a method and system for testing and evaluating a response of an automotive radar system for a specific automotive safety scenario, wherein the method and system generates a simulated reflected radar signature corresponding to at least one virtual target in a specific virtual scenario. The simulated radar signature is generated from one or more of:
a pre-recorded real reflected radar signature from at least one real target in a specific real scenario,
an analytical representation of a radar target signature from at least one virtual target in a specific virtual scenario.

33 Claims, 13 Drawing Sheets

(56) References Cited

U.S. PATENT DOCUMENTS

| | | | |
|---|---|---|---|
| 5,457,463 | A | 10/1995 | Vencel et al. |
| 6,114,985 | A | 9/2000 | Russell et al. |
| 6,950,057 | B1* | 9/2005 | Mussell ............... G01S 7/4052 342/169 |
| 7,504,986 | B2* | 3/2009 | Brandt ................. G01S 13/931 340/435 |
| 7,592,947 | B1 | 9/2009 | Lee |
| 7,652,620 | B2 | 1/2010 | Lee et al. |
| 7,688,257 | B1 | 3/2010 | Christianson et al. |
| 8,026,842 | B2 | 9/2011 | Fox et al. |
| 8,026,844 | B2 | 9/2011 | Fox et al. |
| 8,077,075 | B2 | 12/2011 | Randler et al. |
| 8,330,647 | B2 | 12/2012 | Fox et al. |
| 8,686,893 | B2 | 4/2014 | Watanabe et al. |
| 9,030,351 | B2 | 5/2015 | Fox et al. |
| 9,224,307 | B2 | 12/2015 | Livneh |
| 9,261,593 | B1 | 2/2016 | Mountcastle et al. |
| 9,575,161 | B1* | 2/2017 | Haghighi ............. G01S 7/4052 |
| 2005/0134440 | A1* | 6/2005 | Breed .................. B60N 2/2863 340/435 |
| 2007/0182623 | A1* | 8/2007 | Zeng .................... G01S 7/4026 342/174 |
| 2009/0015460 | A1 | 1/2009 | Fox et al. |
| 2009/0121915 | A1 | 5/2009 | Randler et al. |
| 2010/0283662 | A1 | 11/2010 | Fox et al. |
| 2011/0001657 | A1 | 1/2011 | Fox et al. |
| 2011/0163909 | A1* | 7/2011 | Jeong ................... G01S 13/4463 342/70 |
| 2012/0127016 | A1* | 5/2012 | Watanabe .............. G01S 7/412 342/70 |
| 2013/0002470 | A1 | 1/2013 | Kambe et al. |
| 2014/0015708 | A1 | 1/2014 | Bilik |
| 2014/0062757 | A1 | 3/2014 | Fox et al. |
| 2014/0070981 | A1 | 3/2014 | Kim et al. |
| 2014/0247180 | A1* | 9/2014 | Moriuchi .................. G01S 7/41 342/70 |
| 2014/0322674 | A1 | 10/2014 | Livneh |
| 2014/0368373 | A1 | 12/2014 | Crain et al. |
| 2014/0368807 | A1 | 12/2014 | Matthew |
| 2016/0097839 | A1 | 4/2016 | Fox et al. |
| 2016/0116581 | A1 | 4/2016 | Mohamadi |
| 2016/0223647 | A1 | 8/2016 | Nichols et al. |
| 2017/0115378 | A1* | 4/2017 | Haghighi ............. G01S 7/4056 |

FOREIGN PATENT DOCUMENTS

| | | |
|---|---|---|
| DE | 10 2007 031 040 A1 | 1/2009 |
| DE | 102010031910 A1 | 1/2012 |
| DE | 102013018752 A1 | 5/2015 |
| EP | 0568427 A1 | 11/1993 |
| FR | 3013867 A1 | 5/2015 |
| JP | H01134276 | 5/1989 |
| JP | H10-300838 | 11/1998 |
| JP | H11-23192 | 1/1999 |
| JP | 2001-524676 | 12/2001 |
| JP | 2009-257828 | 11/2009 |
| JP | 2010-48673 | 3/2010 |
| JP | 2011-196938 | 10/2011 |
| JP | 2014-174176 | 9/2014 |
| WO | 99/27383 | 6/1996 |

OTHER PUBLICATIONS

Andrew N. O'Donnell, Compressed Sensing for Radar Signature Analysis, pp. 2631-2639, Oct. 2013, IEEE Transactions on Aerospace and Electronic Systems, vol. 49, No. 4.
International Search Report and Written Opinion dated Feb. 2, 2017 for corresponding International Application No. PCT/SE2016/051031.
Passchier, I. et al (2015). "An Integral Approach to Autonomous and Cooperative Vehicles Development and Testing". 2015 IEEE 18th International Conference on Intelligent Transportation Systems.
O'Donnell, A. N. et al. (Oct. 2013). "Compressed Sensing for Radar Signature Analysis". IEEE Transactions on Aerospace and Electronic Systems, 49(4).
Perälä, H. et al. (2014). "On Efficient Characterization of Radar Targets with Scatterer Set of Target Recognition Using Commercial Ray Tracing Software". Radar Conference 201. IEEE.
Perala. H. u.A.: On Efficient Characterization of RadarTargets with Scatterer Sets for Target Recognition Using Commercial Ray Tracing Software. In: 2014 IEEE Radar Conference, S. 0260-0264.
First Office action and Search Report dated May 14, 2018 in corresponding German Application No. 11 2016 000 27 4.2.
First Office Action and Search Report of the Japanese Patent Office for Corresponding Japanese Patent Application 2017-528224 dated Jan. 5, 2018 and translation.
Ergezer et al., "Hardware-In-The-Loop Radar Test Simulator", Aug. 2014, DOI: 10.5220/0005034506660673.
Passchier et al., "An Integral Approach to Autonomous and Cooperative Vehicles Development and Testing", DOI: 10.1109/ITSC.2015.66.
Passchier Igor et al: "An Integral Approach to Autonomous and Cooperative Vehicles Development and Testing", 2015 IEEE 18TH International conference on intelligent transportation systems, IEEE, Sep. 15, 2015 (Sep. 15, 2015), pp. 348-352, XP032804025, DOI: 10.1109/ITSC.2015.66.
Ergezer Halit Et al: "Hardware-in-the-loop radar test simulator", 2014 4TH International conference on simulation and modelling methodologies, technologies and applications (Simultech), Scitepress, Aug. 28, 2014 (Aug. 28, 2014), pp. 666-673, XP032768670, DOI: 10.5220/0005034506660673.
European Search Report of EP Application No. 16857891 dated Jul. 5, 2019.

* cited by examiner

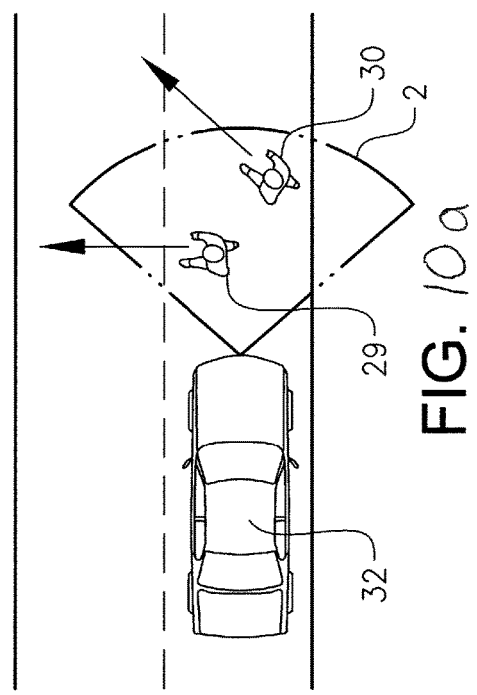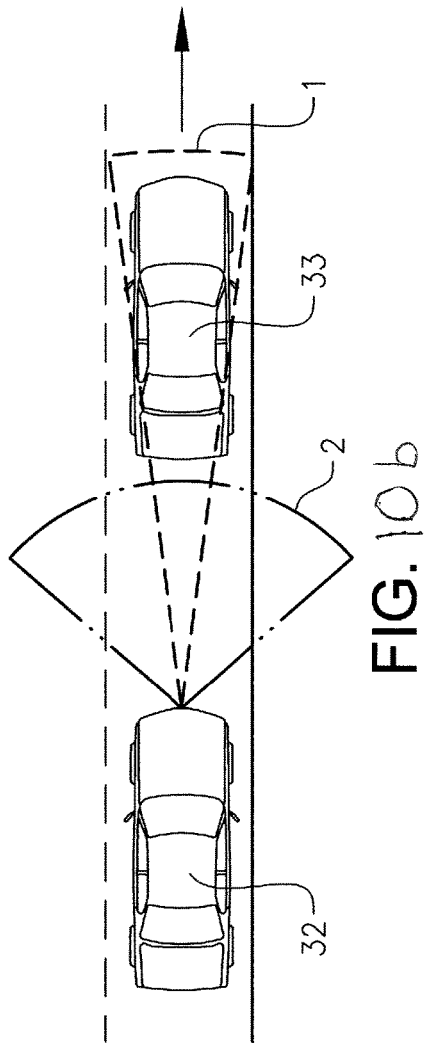

SYSTEM FOR GENERATING VIRTUAL RADAR SIGNATURES

This application is a national phase of International Application No. PCT/SE2016/051031 filed Oct. 21, 2016 which has not yet been published, which claims priority to Application No. SE 1551370-8 filed Oct. 22, 2015.

TECHNICAL FIELD

This invention relates to radar systems and to a method and system for generation of a virtual environment including virtual targets that is meant to be used for evaluation of automotive safety radar systems.

BACKGROUND ART

In order to evaluate the functionality of radar systems in many applications, it is required that they are tested under reproducible, controlled and known conditions similar to real environment. Simulation of radar targets makes it possible to test actual radar systems in an enclosed space, e.g. an electromagnetic chamber or in a lab environment.

Verification of the performance of such radar-based safety system is highly demanded.

SUMMARY OF THE INVENTION

An objective of this invention is to provide a method and a system for testing and evaluating a response of an automotive radar system for a specific automotive safety scenario wherein the above-mentioned problems are avoided. In particular, it is an objective of the invention to improve upon the known methods for testing and evaluating a response of an automotive radar system for a specific automotive safety scenario. This objective is achieved by the method of claim 1 and the system of claim 22.

Considering the many possible scenarios that are likely to occur in real world for each of the above-mentioned radars, in order to certify performance of the safety system more confidently, recreation of scenarios and targets is crucial. One aim of this invention is to introduce an approach to generate frequency modulated continuous wave (FMCW) radar target signatures in a wide variety of scenarios likely to occur in the area of automotive. The objective is to enable verification of automotive radar systems used for advanced driver assistance systems (ADAS) or autonomous driving at sensor or function level using a real hardware in the loop (HIL)/vehicle in the loop (VIL) setup.

The present invention relates to a hardware in the loop setup or vehicle in the loop setup that can emulate various scenarios and targets. Target generation is carried out with two approaches: "analytic" and "record-and-play", which together make it possible to reproduce a large number of radar targets in a wide variety of scenarios.

Hardware in the loop is a setup where a device under test (DUT) input and output are controlled using one system. The system generates the intended reflected radar signal for the DUT, which in this invention is a radar based automotive active safety system. The response or reaction of the DUT is analysed by the test system. Based on the reflected radar signature and how the radar system reacted and what was perceived by the DUT, the performance of the system is evaluated and is reported back to the GUI. The performance of the DUT is not only from the radar in the system but from the whole decision making system in the car including ancillary electronics.

The invention relates to a method for testing and evaluating a response of an automotive radar system for a specific automotive safety scenario, wherein the method comprises:
- arranging at least one automotive radar in a hardware in the loop setup,
- generating a simulated reflected radar signature corresponding to at least one target in a specific scenario,
- receiving the simulated signature by the at least one automotive radar,
- evaluating a response of the automotive radar system by comparing an output from the automotive radar system with an expected output based on the simulated target signature,
- displaying one or more of: error in velocity, error in distance, misdetection of the at least one target and false alarms, wherein the generated simulated reflected radar signature corresponding to at least one target in a specific scenario is generated from one or more of:
- a pre-recorded real reflected radar signature from at least one target in a specific scenario,
- an analytical representation of a radar target signature from at least one target in a specific scenario.

In general, target simulation means generation of electromagnetic reflection signals similar to signals that would have been returned from actual targets. One method to generate such signals is to apply information that is expected to be seen in real target returns to a signature. This information include Doppler shift, radar cross section (RCS), delay, multi path effects, antenna beam pattern, position of target, information regarding the environment, clutter and so on. In addition, in order to generate a sufficient variety of targets, several scenarios and different possibilities need to be considered. In the present invention, in one method real return signals are recorded to be deployed in generation of virtual targets. Using this method, the complexity of adding parameters and complicated calculations will be reduced remarkably and virtually any target or clutter could be reproduced with most authenticity.

This invention means to recreate a wide variety of radar targets according to different scenarios that a radar in automotive safety application might encounter. The objective is to have a hardware in the loop (HIL) setup in which different possible radar targets are generated virtually in order to evaluate and certify functionality of different radars in a vehicle. This is carried out in the present invention with two approaches. In the first one, virtual target is simulated based on an analytic function, in which parameters and assumptions of the desired target are taken into account. The second approach is according to recording real targets in any scenario and playing them for the radar under test. This provides a high degree of flexibility in generation of radar targets and the result would be authentic.

The specific scenario may comprise one or more of:
- at least one target, including pedestrians, cyclists, cars, trucks, animals, motorcycles, construction vehicles, road signs, road obstacles,
- clutter,
- environmental scenario conditions,
- traffic scenario conditions.

With environmental scenario conditions is meant weather, visibility, temperature, humidity and other conditions that may affect the signal to noise ratio (SNR) in radar system, this may include clutter. With traffic scenario conditions is meant the traffic situation in which the at least one target is located. Examples of traffic situations can be a target travelling along a straight line, a target performing a turn, a target in a roundabout, a target performing a manoeuvre or a target parking. Traffic scenario conditions can also be topography affecting the radar signature of the target in the specific automotive safety scenario. In one example of the present invention, different scenarios composing of target(s), surrounding environment as well as other influential factors such as weather conditions are represented by a set of reflector points. These points are obtained using ray-tracing method for each extended object in the scenario. An extended object is an object which has multiple reflector points (point targets) separated by specific distances from each other. For example, a vehicle is normally regarded as extended object. In the next step, a motion model of scenario components is taken into account considering the position of vehicle under test (VUT) and its radar beam to identify and mark relevant reflector points. For each of these, changes in phase and amplitude of the transmitted signal by the radar on the VUT are calculated similar to a single-point problem. This forms the basis of signal generation for the VUT. The signal is then sent to RF front end.

Further aspects relevant to target scenario generation, e.g. the role of radar specifications, angular information, synchronization between target simulator and VUT, combination of analytical targets with the results from record-and-play setup will be described further.

The virtual target and the virtual scenario may be selected through a graphical user interface. Using a graphical user interface makes the selection process easier for a user of the method, as the graphical user interface can visualize the scenario and allow for a more intuitive adjustment of scenario targets, scenario conditions and other parameters.

The pre-recorded real reflected radar signature from a target in a specific scenario may be generated by a processing unit by accessing a pre-recorded real reflected radar signature database.

The pre-recorded real reflected radar signature database may be created by recording real reflected radar signal with a radar recorder system, wherein the radar recorder system records target data, clutter data and environmental scenario conditions and traffic scenario conditions and stores each data in a respective target data database, clutter data database and scenario conditions database.

The analytical representation may be based on target parameters of the target in a specific scenario and of scenario parameters of the specific scenario.

Target parameters of the analytical representation may be one or more of:
  type of target including pedestrians, cyclists, cars, trucks, animals, motorcycles, construction vehicles, road signs, road obstacles,
  target velocity, distance, angle or trajectory of movement,
  target radar cross section (RCS), including the case of partial coverage of target by radar beam, and change in RCS over time.

Scenario parameters of the analytical representation may be are one or more of:
  environmental scenario conditions,
  traffic scenario conditions.

The virtual environmental scenario conditions may be one or more of:
  geographical maps,
  static objects in the virtual environment,
  weather conditions.

The method may further comprise:
  providing 3-D graphical models and point clouds for reflecting radar rays for all physical elements in the specific virtual scenario. Using 3-D graphical models of physical elements allow for calculation of point sources from which reflected radar rays can be calculated. They also allow for a visual representation of the scenario.

Extended object signatures may be created from aggregating radar signatures of point targets in point clouds. All point sources of a 3-D model form a point cloud for that object. The point cloud represents the major reflector points for each 3-D model. The process of making a 3-D model and calculate its reflectors (point cloud) from each angle can be done off line to create a library. This offline calculation is very important to be able to create the simulated reflected radar signature or signal in real time. To create a radar signature from a target, a neural network can be trained which receives the angle and type of object as input and produces the signal corresponding to that, according to above. Instead of needing a big library of all object signatures from each and every angle, we can store a much smaller and lower complexity neural network per object.

The method may further comprise:
  continuously updating virtual scenario parameters based on decisions input of the vehicle under test. A vehicle experiencing feedback from its radar system may take action and adapt its behaviour, for instance it may auto break if an object enters its detection zone. This input is fed into the method and the scenario parameters are thereby updated.

The method may further comprise:
  generating a simulated reflected radar signature including instantaneous amplitude and instantaneous phase for a target moving along any arbitrary trajectory.

The method may further comprise:
  identification of reflecting points and paths causing secondary reflections. Secondary reflections have lower level of power compared to primary reflections and represents false targets in longer distances due to travelling over non line-of-sight path.

The simulated reflected radar signature may be randomly selected based on specification of target parameters, list of scenarios and scenario conditions.

The simulated reflected radar signature may be a full continuous wave.

Method according to any one of the preceding claims, wherein the method comprises:
  adapting the simulated reflected radar signature based on changes in radar parameters. During testing various parameters of the radar under test may change. These changes are monitored and fed to the method in order to continuously adapt the method to the new radar parameters.

The method may further comprise:
  generating a simulated reflected radar signature that reflects angular position of the virtual target. A target may be located at different positions and the angular position relative to the VUT is important to determine. The method allow for simulation of angular position of the virtual target.

The method may further comprise:
  generating a simulated reflected radar signature corresponding to at least one virtual target for a single steering beam radar. A benefit of using one beam to handle the beam steering angular information, is that is it not necessary to steer the beam with the speed of the radar steering beam. This reduces the cost and requirements on the RF front-end. It also reduces the risk of error in angular information.

The method may further comprise:
generating a scenario wherein radar reflection is mainly present in side lobes of the radar under test.

The method may further comprise:
combining virtual signatures from both a pre-recorded real reflected radar signature and an analytical representation of a radar target signature. By combining virtual signatures from both a pre-recorded real reflected radar signature and an analytical representation of a radar target signature more scenarios can be generated.

The invention further relates to a system for testing and evaluating a response of an automotive radar system for a specific automotive safety scenario, wherein the system comprises:
at least one automotive radar in a hardware in the loop setup,
an electronic computer unit connected to the at least one automotive radar,
an evaluation module (for evaluating the performance of radar-based safety system),
a graphical user interface,
a radar front end arranged to generate a simulated reflected radar signature corresponding to at least one target in a specific scenario,
wherein the generated simulated reflected radar signature corresponding to at least one target in a specific scenario is generated from one or more of:
a pre-recorded real reflected radar signature from at least one target in a specific scenario,
an analytical representation of a radar target signature from at least one target in a specific scenario.

The radar front end may comprise a first receiver antenna arranged to receive a signal from the radar under test on the VUT, an amplifier, a mixer arranged to add the target scenario radar signature, and a transmit antenna arranged to transmit the simulated reflected radar signal for the VUT.

The radar front end may further comprise a synchronization sub-system comprising a second receiver antenna arranged to receive radar signals from the VUT to detect changes in radar parameters. The sub-system allows for continuous update of the system in order to adapt the method for changes in the radar parameters during testing and is used when the system changes its behaviour or uses angular information.

The system may further comprise a radar front end arranged to simulate a virtual target with angular information for single steering beam radar and/or monopulse radar.

The radar front end may be arranged to simulate a virtual target with angular information for single steering beam radar is a radar front end comprising a synchronization sub-system.

The radar front end may be arranged to simulate a virtual target with angular information for a monopulse radar comprising a target scenario generator (TSG) comprising a receiving antenna, a first TSG transmitter antenna and a second TSG transmitter antenna.

The specific scenario may comprise one or more of:
at least one target,
clutter,
environmental scenario conditions,
traffic scenario conditions.

In the system, the pre-recorded real reflected radar signature from a target in a specific scenario may be generated by a processing unit by accessing a pre-recorded real reflected radar signature database.

In the system, the pre-recorded real reflected radar signature database may be created by recording real reflected radar signal with a radar recorder system, wherein the radar recorder system records target data, clutter data and environmental scenario conditions and traffic scenario conditions and stores each data in a respective target data database, clutter data database and scenario conditions database.

In the system, the analytical representation may be based on target parameters of the target in a specific scenario and of scenario parameters of the specific scenario.

In the system, target parameters of the analytical representation may be one or more of:
type of target including pedestrians, cyclists, cars, trucks, animals, motorcycles, construction vehicles, road signs, road obstacles,
target velocity, distance, angle or trajectory of movement,
target radar cross section (RCS), including the case of partial coverage of target by radar beam, and change in RCS over time.

In the system, scenario parameters of the analytical representation may be one or more of:
environmental scenario conditions,
traffic scenario conditions.

In the system, the simulated reflected radar signature may be randomly selected based on specification of target parameters, list of scenarios and scenario conditions.

In the system, the simulated reflected radar signature may be a full continuous wave.

The system may be arranged to combine virtual signatures from both a pre-recorded real reflected radar signature and an analytical representation of a radar target signature.

BRIEF DESCRIPTION OF THE DRAWINGS

FIGS. 10a-10c shows target scenarios considered for analytic target generation.

DETAILED DESCRIPTION

Figure 1:
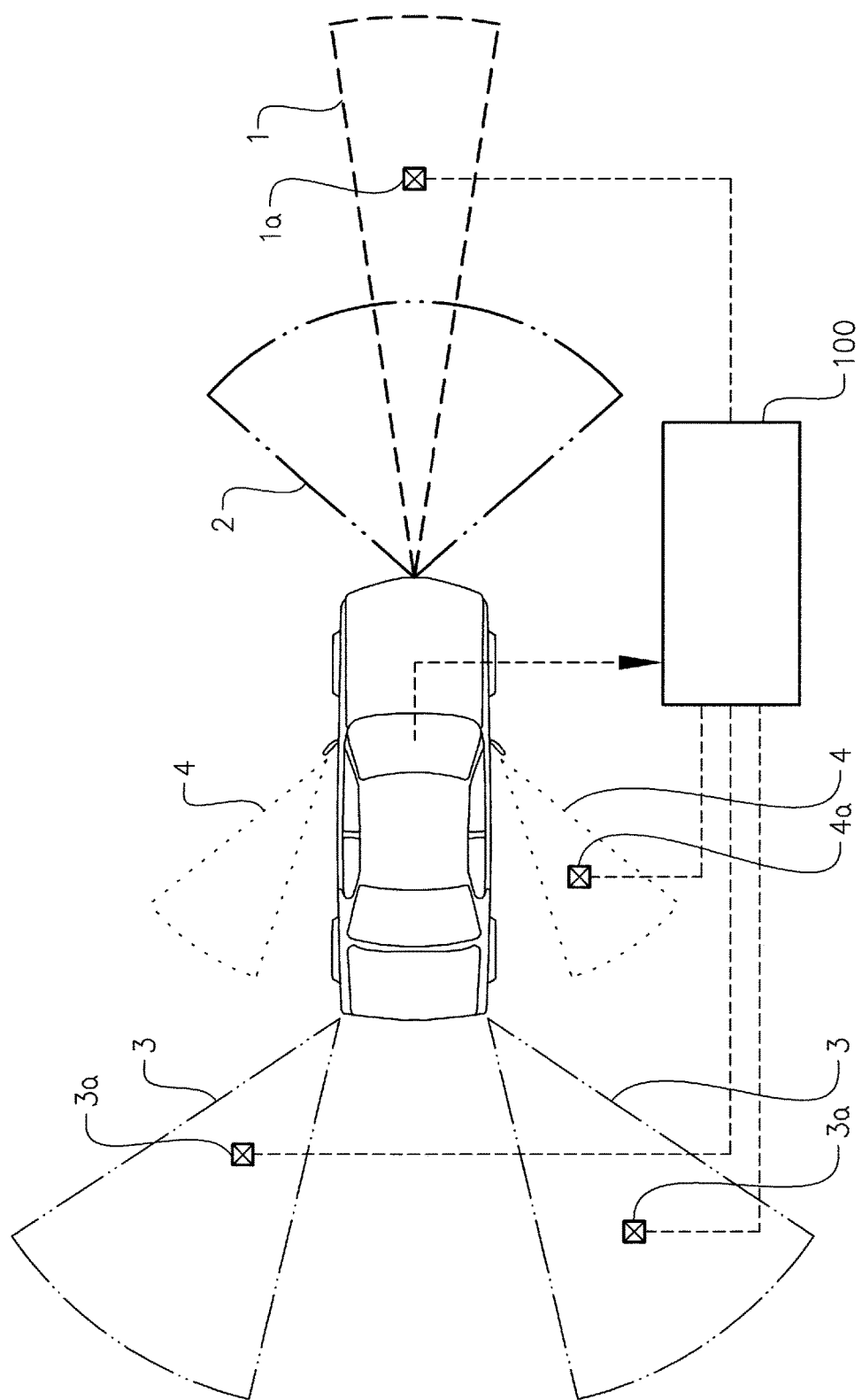
FIG. 1 shows a vehicle comprising different radars used in automotive safety applications.

FIG. 1 provides a view of the radar system in automotive safety application. FIG. 1 shows a vehicle comprising different radars used in automotive safety applications arranged in a hardware-in-the-loop set-up. The vehicle comprises two radars located in the front of the vehicle; a first radar 1 with a narrow beam, which for example is used to detect other road users moving at high speeds while adaptive cruise control (ACC) functionality is in use. A second radar 2 with a wider beam is arranged to detect for instance pedestrians or cyclists that appear in front of the vehicle to avoid collision. Rear radar sensors 3 at the back of vehicle alert if crossing traffic is moving in the areas behind the vehicle. Door mirror radars 4 are arranged to detect targets in the blind spots of the vehicle. The radars as well as an electronic control unit (ECU) are connected to a target simulator 100. Objects 1*a*, 3*a* and 4*a* correspond to virtual targets to be detected by each of the radars 1, 3 and 4. The feedback from each radar as well as any other feedback from the ECU is fed back to the target simulator. A more detailed description follows.

Figure 2:
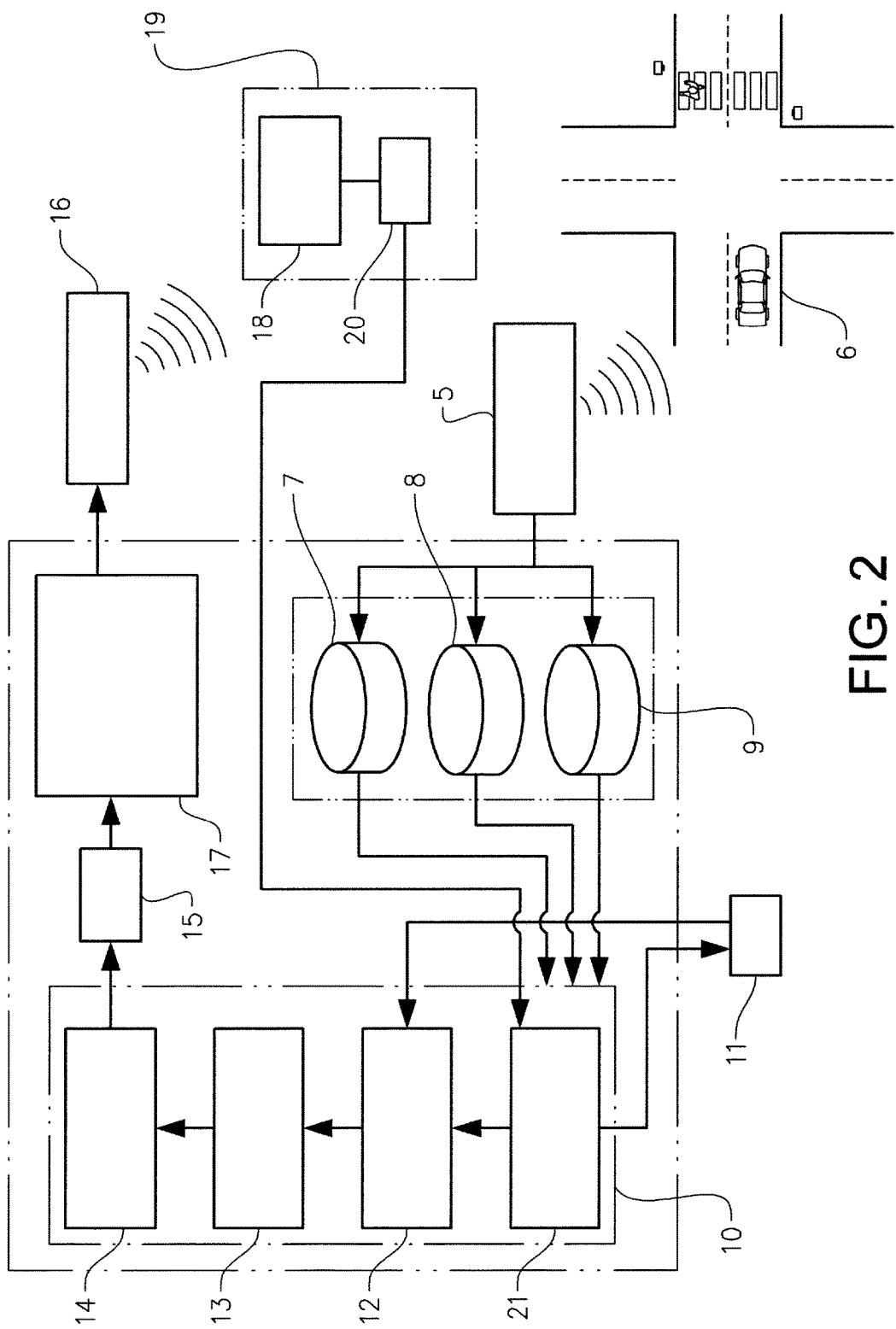
FIG. 2 is a schematic hardware block diagram for the hardware in the loop (HIL) setup.

A detailed description of the hardware setup is indicated in FIG. 2. In the first approach for target generation, the record-and-play approach or pre-recorded approach, the radar recorder system 5 captures a real target scenario 6. The measurements of the real target scenario form a real target database 7, a real clutter database 8, as well as a database for real scenario conditions 9. The data bases 7, 8, 9 are then used by the processing unit 10 to be used for generation of relevant virtual signals, i.e. a virtual target signature.

In the second approach, the analytical representation approach, a scenario for virtual target generation 12 is selected according to user commands from Graphic User Interface (GUI), 11. The virtual target scenario is applied to the analytic virtual target generation unit 13, where the signature of the desired virtual target is theoretically calculated and then generated in signal generation unit 14. The analogue signal from processing unit is converted to digital in a digital-to-analogue converter 15. It may be required to adjust the amplitude and range of the signature in order to make it suitable to be transmitted by the RF front end, 16. Signal amplification and conditioning circuit, 17, satisfies this need.

The vehicle under test 19 consists of a radar system, 18, which receives the generated simulated reflected radar signature corresponding to a virtual target and an electronic Computer Unit (ECU) 20, which performs data processing and forwards the result to evaluation module, 21. The evaluation module 21 measures the performance of the radar-based safety system and displays the results on the GUI 11. The radar system under test is, as a first estimate, expected to perform perfectly. Experience demonstrates that in reality it does not. By generating a controlled virtual environment, by knowing what output is expected from the radar system and by observing the reaction of the radar system or DUT, we can measure the actual performance of the whole system.

The following parameters are considered important with regard to generated simulated reflected radar signature from both pre-recorded real and analytical virtual scenarios in automotive safety area:

Type of target, which includes pedestrians, cyclists, cars, trucks and other road users,
environmental scenario conditions,
traffic scenario conditions.
Target velocity, distance, angle or trajectory of movement,
Different weather conditions, affecting signal to noise ratio (SNR) in radar system,
Radar Cross Section (RCS) of target, including the case of partial coverage of target by radar beam, and change in RCS over time.

Figure 3:
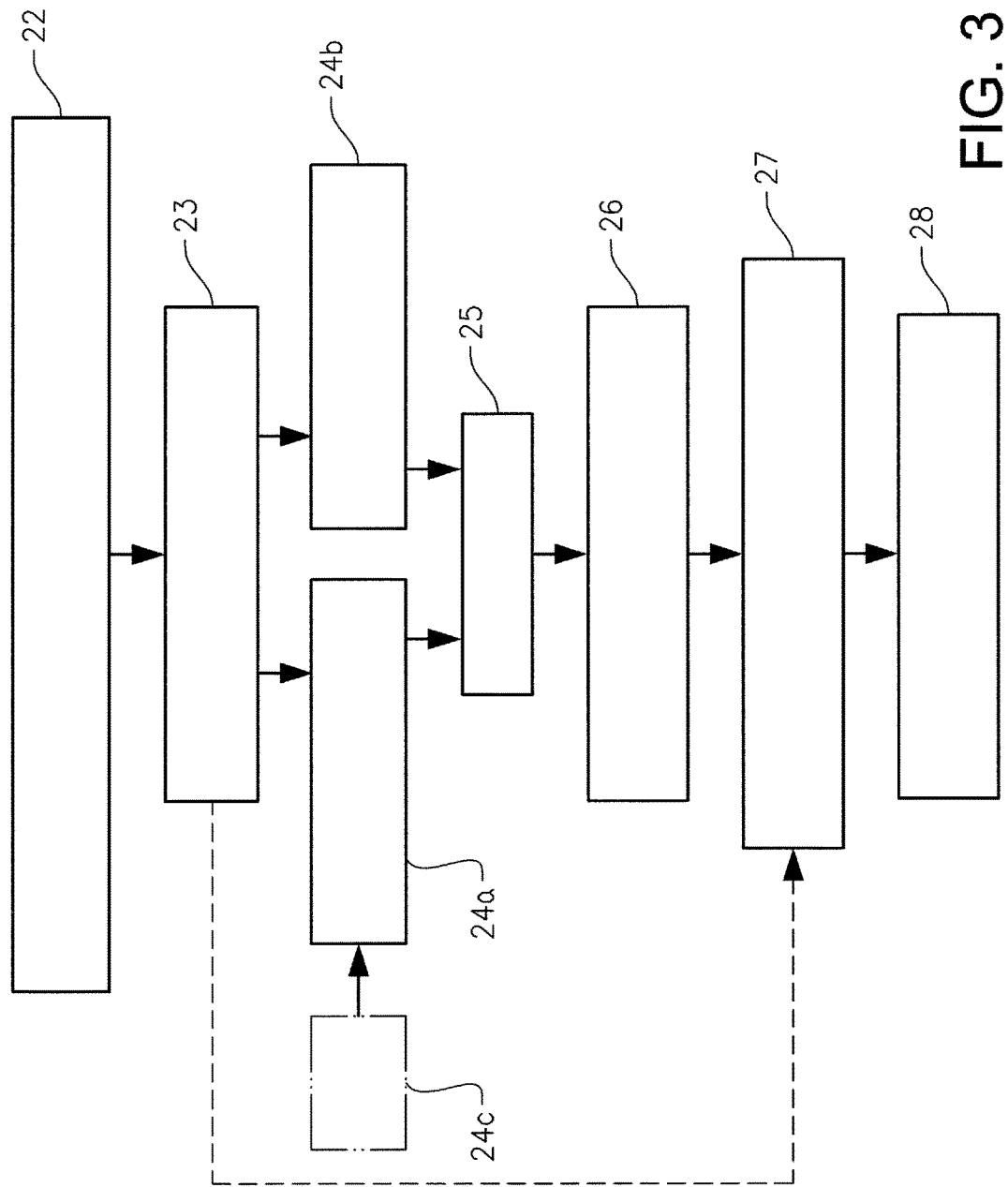
FIG. 3 schematically shows a flowchart of the target signature generation and HIL process.

FIG. 3 schematically shows a flowchart of the target signature generation and HIL process.

In the first block 22, a user will choose the general framework of the test scenario by specifying the parameters of the virtual target, the conditions of the virtual environmental scenario and the conditions of the virtual traffic scenario. In the second block, 23 the system randomly generates details of the scenario to be emulated based on the selected parameters and conditions. In block 24*a* or 24*b*, the system selects one or more virtual targets in a virtual scenario from the real scenarios taken from the database 24*c* of recorded real scenarios (block 24*a*) or from the analytical scenarios (block 24*b*). In block 25, a simulated reflected radar signature corresponding to at least one virtual target in a specific virtual scenario is generated and applied to the vehicle under test. In block 26, the simulated reflected radar signature is received by the radar system in the vehicle under test. In block 27, the results of the vehicles radar-based system reaction are evaluated by comparing the radar system output with the virtual target signature. In block 28, the performance is presented to the user. Performance can for instance be velocity/distance error, detection or no detection and false alarms.

Figure 4:
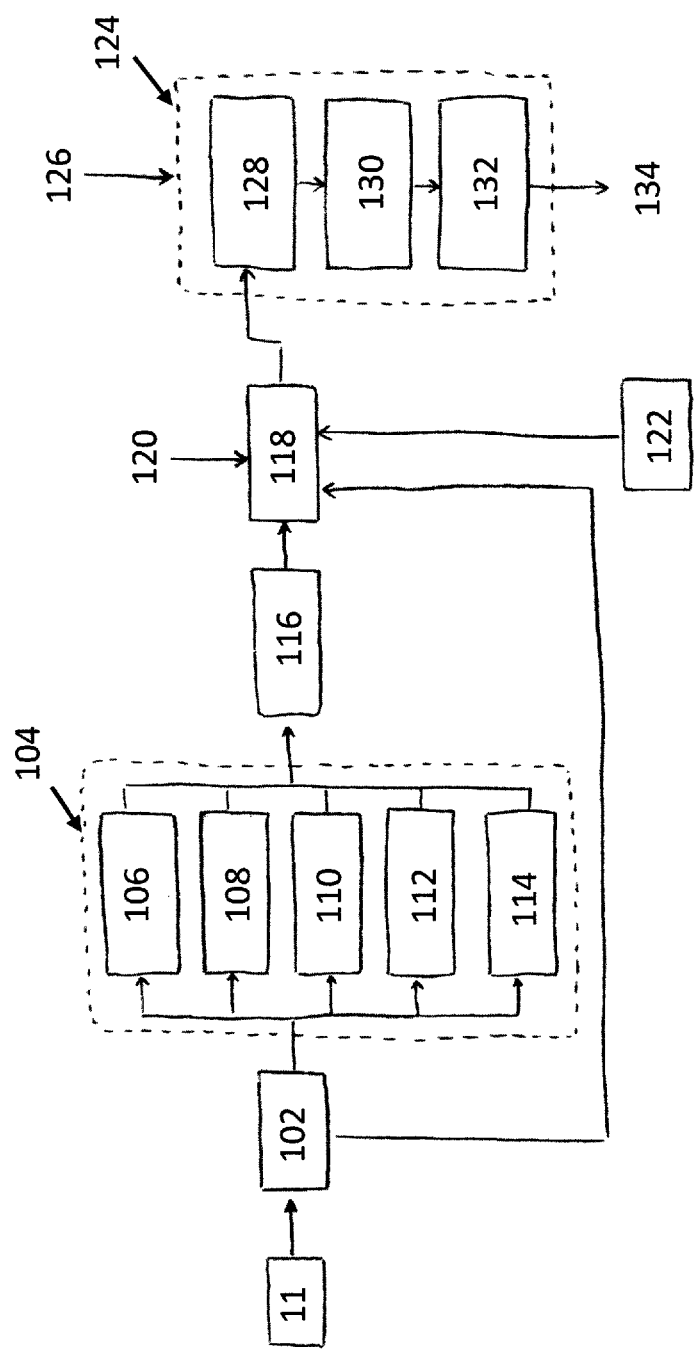
FIG. 4 schematically shows a flowchart over a more detailed procedure for target signature generation using analytical target generation according to one example embodiment.

FIG. 4 schematically illustrates an example of a more detailed procedure for target signature generation using analytical target generation according to one example embodiment.

The procedure consists of the following steps:

Scenario Selection:

Firstly, a test scenario needs to be selected. The user can select, through a graphical user interface (GUI) 11, different elements of the scenario and target features for a specific test situation. The scenario selection is done in block 102. Scenario selection enables repeatable testing of the VUT for the purpose of signal processing algorithm development and verification of performance in a specific situation. Scenario selection can also be carried out in a random fashion. Therefore, it would be possible to evaluate performance of the VUT at the final step to ensure its validity and reliability in a number of diverse real-world situations.

Analytical Library:

The analytical library 104 encompasses 3D graphical models as well as point clouds for all components that might appear in a selected scenario from block 102. The components include geographical maps and traffic situations in block 106, different types of vehicles in block 108, other road users in block 110, static objects such as buildings and trees in block 112 and weather conditions like rain, fog, dust etc. in block 114. First, a 3-D graphical model is formed for all these elements. To achieve this, a wire-frame model is created and rendered for each extended object. The resulting 3-D models are then illuminated from different angles and the amount of reflection from each angle is measured using ray-tracing technique. Illumination is done by a radar signal. Ray-tracing (in simulation) starts from the location of the radar transmitter, continues on a ray from the radar to different points in the target and then find which rays will finally return back to the radar receiver. The location of the point reflectors on each object depending on the angle of the radar looking on that object are pre-calculated and stored in a library. In this way, major reflector points for each component can be identified and marked on the 3-D model of that component. This is stored in the analytical library 104 as point clouds for extended objects.

Environment Generation:

At step 116, graphical models of components from blocks 106, 108, 110, 112 and 114 are combined to represent an environment relating to the desired scenario selected in block 102.

Scenario Generation:

A scenario can be generated at this stage according to the trajectory of the VUT, and motion pattern(s) of target(s) and other components in the simulated environment. This is done in block 118.

Scenario generation is preferably an adaptive real-time process. It is influenced by the reactions of VUT due to radar-based decisions. When the VUT takes a course of action, for example braking due to Autonomous Emergency Braking (AEB), the radar's heading angle and the relative position of other scenario components would change. Thus, the scenario generator needs to accommodate itself to this change to represent the new situation. The decisions of the VUT are therefore applied to scenario generation block 118 for this update by means of decision input 120. Scenario generation can also be carried out by combining a recorded library 122 with the analytical library 104. This is explained later in more detail.

Signal Generation:

Signal generation is performed in block 124. Input parameters of the radar under test are input into the signal generation as radar parameter input 126. A radar signal is the projection of a three-dimensional world into one dimension. This means that radars cannot capture every detail in the environment and some information will be lost. Due to the fact that radars miss information, the complexity of target scenario generation for radars reduces dramatically as a result. Due to the reduction in complexity, target scenario generation needs only to recreate the features of the target scenario that are actually visible to the radar. Radar captures information from elements that reflects its signal back. Thus, after scenario generation, the marked reflector points from the target scenario that fall into the field of view (FoV) of the radar under test and can receive radar signal and echo it back needs to be identified in block 128. This is done either from direct (or primary) reflection or through a secondary or tertiary reflection. It is explained later how to deal with secondary or tertiary reflections but at present "reflection" refers to direct or primary reflections.

Further, during a scenario distance and velocity of various components in relation to the VUT will change, not only because they move, but also due to repositioning of VUT. Further, the arrangement of reflector points might alter, as extended objects might demonstrate different reflecting properties from different angles. Therefore, relative velocity and distance need to be computed continuously over time. This is done in block 130.

Each relevant reflector point is considered as a point target. In an FMCW radar, distance and speed information of a point target create an instantaneous phase/frequency in the radar received signal. Thus, in the target scenario generator, each relevant reflector point at a specific distance and velocity would be represented by an instantaneous phase/frequency and amplitude. Calculation of this instantaneous phase is explained for a point target with (a) fixed radial speed and distance, (b) fixed speed on linear path and (c) time-varying speed with arbitrary motion path later in the text. The calculation is performed in block 132. This approach forms the basis of the signal generation according to the present example embodiment.

Changes in the scenario due to radar-based decisions of the VUT, i.e. decision inputs 120, also necessitate revision in the signal generation as explained before.

The complete target/scenario signature is output in step 134.

Figure 5:
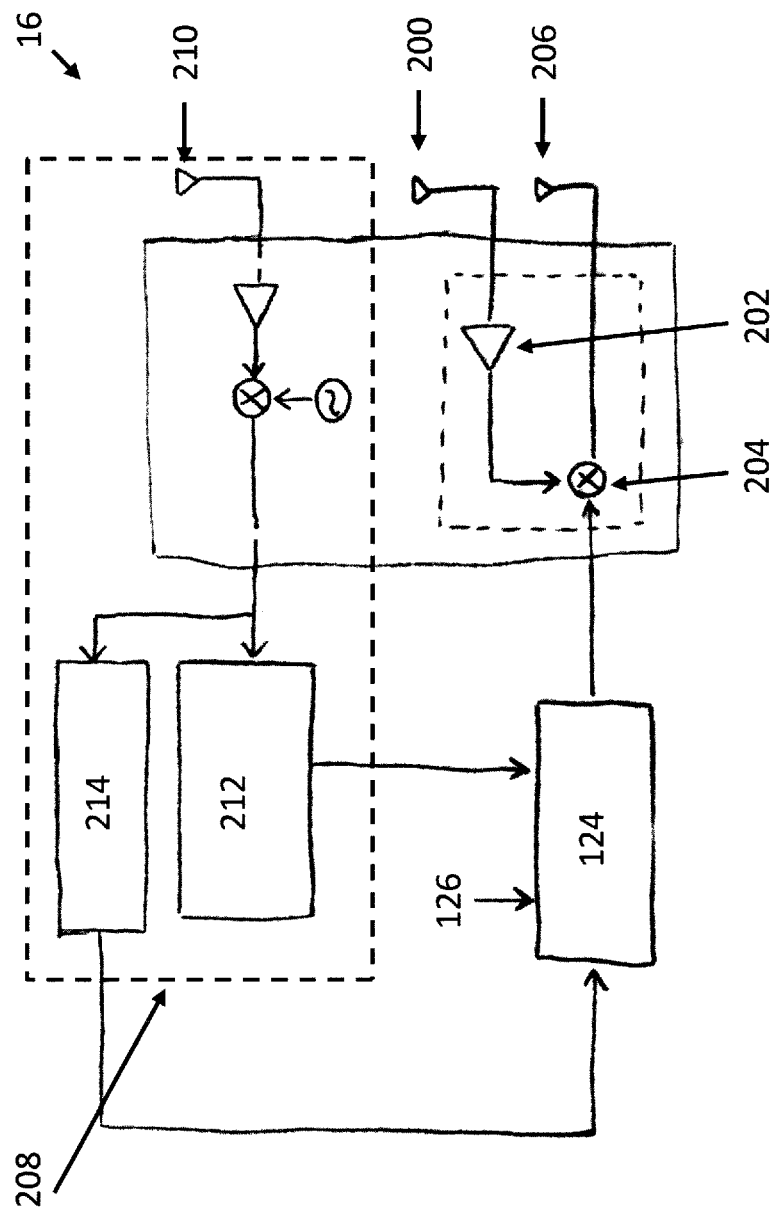
FIG. 5 illustrates a radar front end of a target scenario generator including a synchronization sub-system.

A radar front end 16 of a target scenario generator including a synchronization sub-system 208 is shown in FIG. 5. This is one example of a radar front end 16 of FIG. 2. The radar front end 16 comprises a first receiver antenna 200, which receives a signal from the radar under test, an amplifier 202, a mixer 204 which adds the target scenario signature, created with the analytical method or the recorded one to the signal from radar under test, and a transmit antenna 206, which transmits the simulated reflected radar signal for the VUT.

In synchronization sub-system 208, a second receiver antenna 210 receives radar signals from the VUT to detect changes in radar parameters, as explained further below. The signals received by the second receiver antenna 210 are used in sweep parameter analysis 212 and received signal power analysis 214 which are also part of the synchronization sub-system 208.

The results of these analyses are input into the signal generation together with radar parameter inputs 126 to continuously update the signal generation 124. The sweep parameter analysis 212 may send a trigger to the signal generation if synchronization is needed. The output from the signal generation is then fed to transmit antenna 206.

A detailed description of calculation of instantaneous phase/frequency for various cases follows. A simplified calculation is presented after the detailed description.

Instantaneous Phase/Frequency for a Point Target:

In an FMCW radar, a bandwidth $\Delta f$ around an operating frequency $f_0$ of the radar is swept linearly over a duration of T seconds. FMCW radar transmits a continuous signal whose frequency changes with sweep shape.

The reflected radar signal from the target contains information of the distance and the velocity of the illuminated target. Using triangular sweeps this information can be extracted from the instantaneous frequency of the received signal. For target scenario generation, reverse procedure of extraction of such information needs to be followed.

Figure 6:
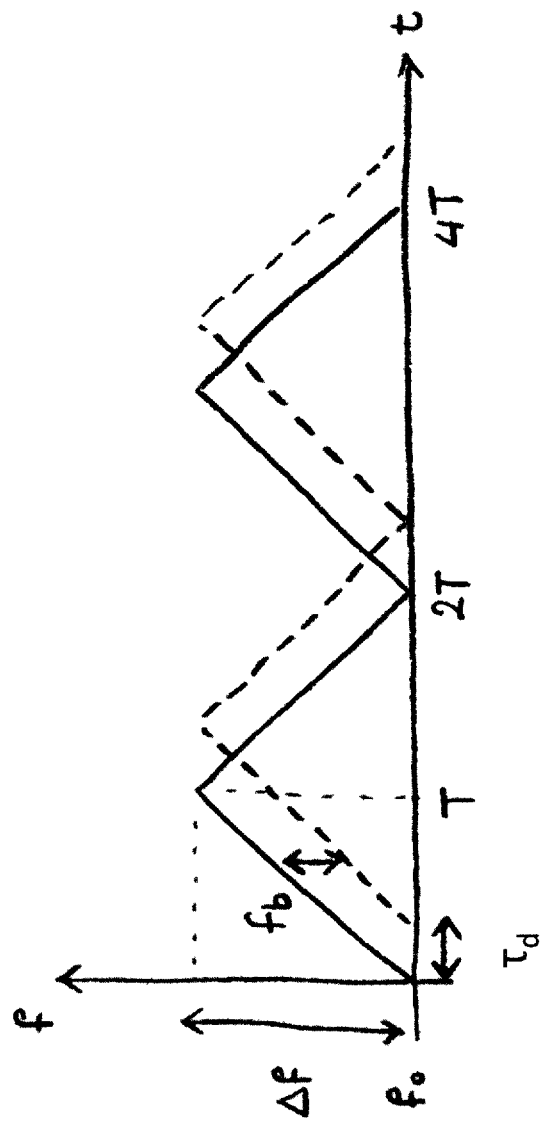
FIG. 6 illustrates a sweep with an FMCW radar for a stationary target.

Fixed Radial Speed:

FIG. 6 illustrates a sweep with an FMCW radar for a stationary target. A stationary target would cause a delay $\tau_d$ to a radar signal depending on its distance R from radar system, where $\tau_d$ is described by equation 1:

$$\tau_d = \frac{2R}{c}$$

where c is the speed of light. Thus, the radar receives a delayed version of the transmitted signal that results in a frequency difference $f_b$ at the radar receiver, observed at Intermediate Frequency (IF) level. Simulation of this target needs generation of the phase expression that represents this delay, or equivalently the beat frequency $f_b$ as seen in equation 2:

$$f_b = \frac{\Delta f}{T}\tau_d$$

The instantaneous phase/frequency corresponds to an in-phase component I(t) and a quadrature component Q(t)

that are mixed with the received signal from the radar later in the RF part of the target scenario generator, as seen in equations 3 and 4:

$$I(t)+jQ(t)=A(t)e^{j\varnothing(t)}$$

where $$\varnothing(t)=2\pi f_b t$$

Figure 7:
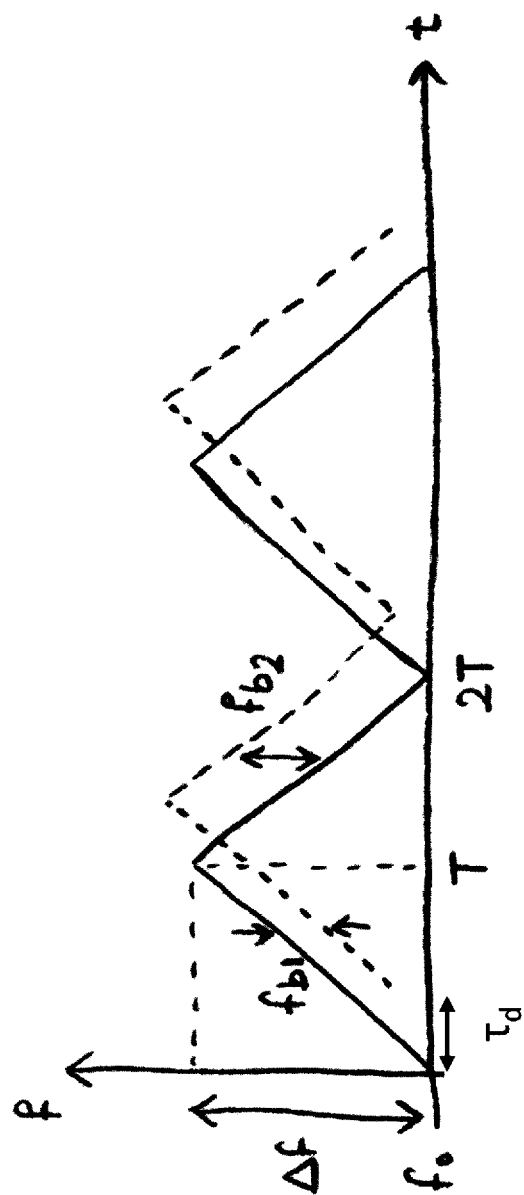
FIG. 7 illustrates a sweep with an FMCW radar for a moving target.

For a moving target with a velocity of v, both a delayed and frequency shifted version of transmitted signal would return to radar. FIG. 7 illustrates a sweep with an FMCW radar for a moving target. The two beat frequencies $f_{b1}$ and $f_{b2}$ appearing at the radar receiver include information of target velocity and distance. These can be extracted using equations 5 and 6

$$f_{b1} = -\frac{2}{\lambda}v + \frac{2}{c}\frac{\Delta f}{T}R$$

and $$f_{b2} = -\frac{2}{\lambda}v - \frac{2}{c}\frac{\Delta f}{T}R.$$

$\lambda$ is the radar signal wavelength, $\lambda=c/f_0$. In this case, the instantaneous frequency or the in-phase and quadrature signals should be generated to match the alternating beat frequencies.

Figure 8:
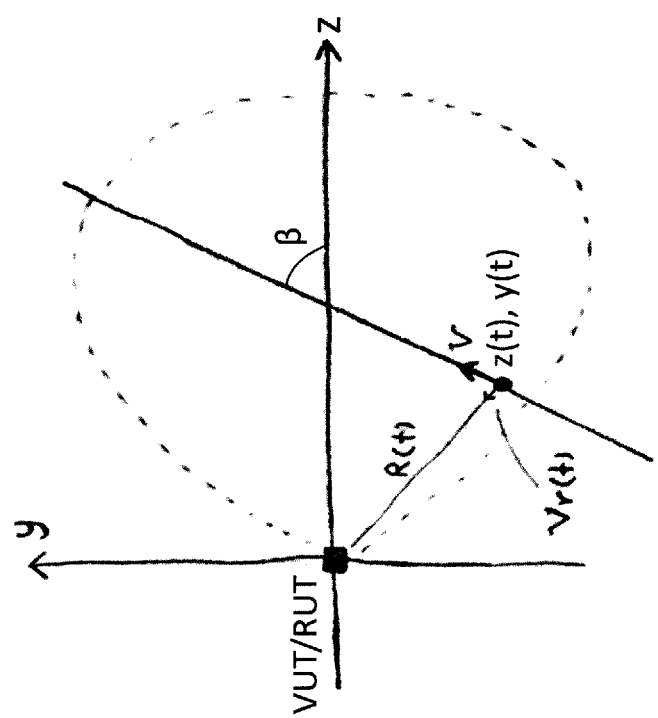
FIG. 8 illustrates an example of a motion model for a target moving along a linear path.

Linear Motion Model:

An example of a linear motion model is illustrated in FIG. 8.

The scenario of a target moving along a straight path in front of a radar can be quite common in automotive field. The phase change in the radar signal by this target is a function of time. The instantaneous frequency of the demodulated signal at radar receiver is also varying because at each position the radar observes a different speed and distance from target. In FIG. 8 the motion is illustrated in a planar coordinate system, where each point on the line can be provided with an x and y coordinate. As the target moves, the coordinates change with time, i.e. z(t) and y(t). Thus, instantaneous frequencies vary over time with radial speed $v_r(t)$ and distance R(t) according to equation 7

$$v_r(t) = v \cos\left(\beta - \arctan\frac{y(t)}{z(t)}\right)$$

where $\beta$ is the angle between the z-axis and the linear path, and R(t) is described by equation 8:

$$R(t)=\sqrt{z^2(t)+y^2(t)}.$$

The instantaneous frequencies vary over time with radial speed and distance according to equations 9 and 10:

$$f_{b1}(t) = -\frac{2}{\lambda}v_r(t) + \frac{2}{c}\frac{\Delta f}{T}R(t)$$

and $$f_{b2}(t) = -\frac{2}{\lambda}v_r(t) - \frac{2}{c}\frac{\Delta f}{T}R(t)$$

Figure 9:
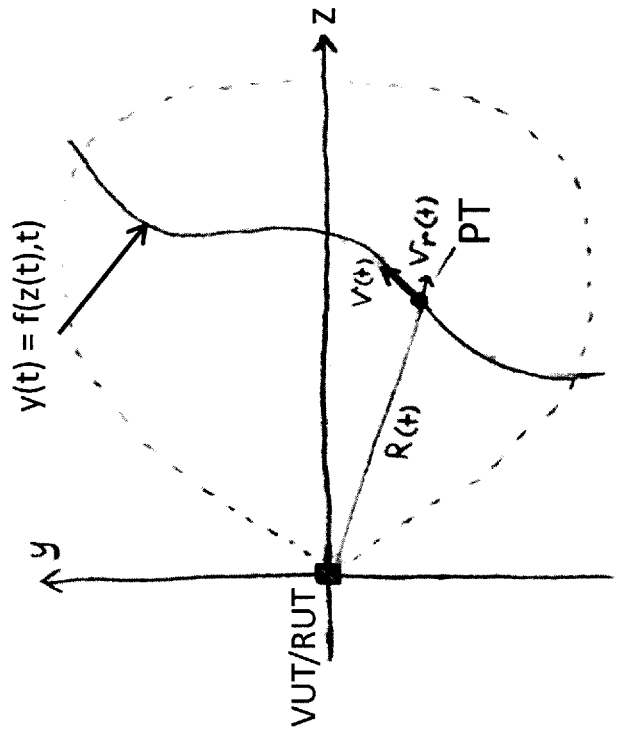
FIG. 9 illustrates an example of a motion model for a target moving along an arbitrary path.

Arbitrary Motion Model:

FIG. 9 illustrates an example of a motion model for a target moving along an arbitrary path. The signature of a point target PT moving on an arbitrary path is described by equation 11, $$y(t)=f(z(t),t)$$

can be obtained similar to the linear motion. At any moment, the radar's observation of speed $v_r(t)$ and distance R(t) of a target are calculated and the corresponding instantaneous phase is found, based on equation 12

$$v_r(t)=v(t)\cdot u$$

where v(t) is the vector of target speed at any time instant and u is the unit vector which specifies the direction of the line connecting radar to location of target at time t as described in equation 13

$$u = \frac{(z(t), y(t))}{|(z(t), y(t))|}$$

Parameters of Radar Under Test:

FMCW radar sweep parameters, i.e. bandwidth, sweep length, the shape, and operating frequency of radar on VUT are essential for estimating instantaneous phase in signal generation step. This is illustrated by radar parameter input 126 of FIG. 4. This is why the target scenario generator should be designed per such specifications, or per radar under test. However, the main steps of the target scenario generation are independent of radar specifications and only from the signal generation step 124, radar specifications influences the method.

Another point is that, if the FMCW radar sweep parameters are changed during the time the radar is doing measurements or is being tested, the target scenario generator has the facility to re-acquire these parameters and adapt itself accordingly. For this, synchronization is needed and performed by a synchronization sub-system as described above. The sub-system comprises an independent radar receiver that observes the signal from the radar transmitter(s) and analyses it for sweep parameters. The output of this analysis is a trigger applied to the signal generation block 124 of FIG. 4 to synchronize the target scenario generation transmitter with the radar under test when synchronization is needed.

Secondary and Further Reflections:

Electromagnetic waves transmitted by a radar can also be reflected back indirectly to it, after hitting one or more additional reflecting surfaces. At 24 GHz and 77 GHz frequencies, the absorption of a radar signal is quite high. Normally, not more than secondary reflections appear in a radar received signal.

Secondary reflections have lower level of power compared to primary reflections and represents false targets in longer distances due to travelling over non line-of-sight path.

As a result, considering secondary reflections is equivalent to emulation of targets with less power in longer distances. Similar to the approach for primary reflections, after scenario generation, it should be identified which reflecting points and which paths cause secondary reflections. From this step, the distance would be calculated to be used by the point-target model to find the corresponding instantaneous phase.

Figure 10C:
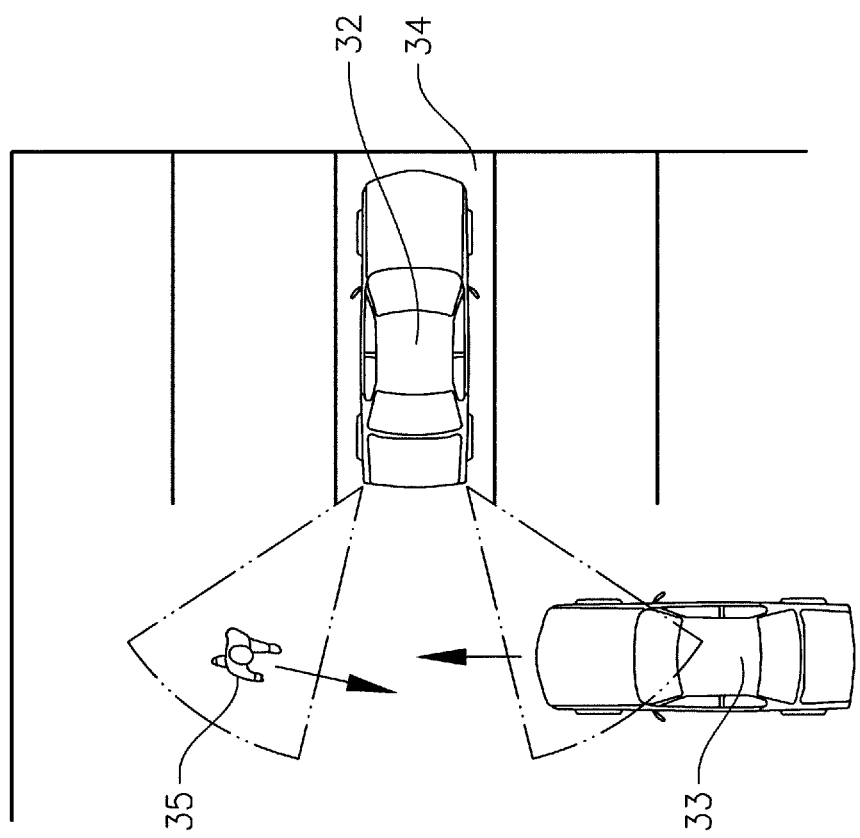

FIGS. 10a-10c schematically illustrates various cases of target movement used in analytic target generation. This is a simplified version of the above described calculations in conjunction with FIGS. 8 and 9.

In analytic target generation, the primary scenario for target movement is the movement along a straight path in front of the radar. This is probably one of the most common cases in automotive application. FIG. 10*a* illustrates two pedestrians 29, 30 crossing a road 31 in front of vehicle 32. The first pedestrian 29 crosses the road 31 in a straight line perpendicular to the direction of the road 31. The second pedestrian 30 crosses the road 31 in a line, which is tilted at an angle relative to the direction of the road 31. The second radar 2 is used in order to detect the pedestrians 29, 30.

FIG. 10*b* illustrates two vehicles 32, 33 moving along a linear path, for instance along a lane of the road 31. In most moving traffic scenarios, vehicles move along a linear path, either towards or away from the front radar of a vehicle. The first radar 1 with a narrow beam is used to detect the second vehicle 33 moving at high speed. This scenario can for instance represent use of adaptive cruise control (ACC).

FIG. 10*c* illustrates detection of moving objects by a rear radar. This scenario can for instance represent a vehicle 32 backing out of a parking space 34. In FIG. 10*c*, a pedestrian 35 moves behind the vehicle 32. At the same time, a second vehicle 33 moves behind the first vehicle 32. Rear radars usually detect traffic moving along a straight line tilted with an angle relative to the direction of the radar beam due to the placement of the radars.

For generation of virtual targets in the cases described in conjunction with FIGS. 10*a*-10*c*, we need to calculate what the radar receives from the desired target. This is further elaborated on below.

Figure 11A:
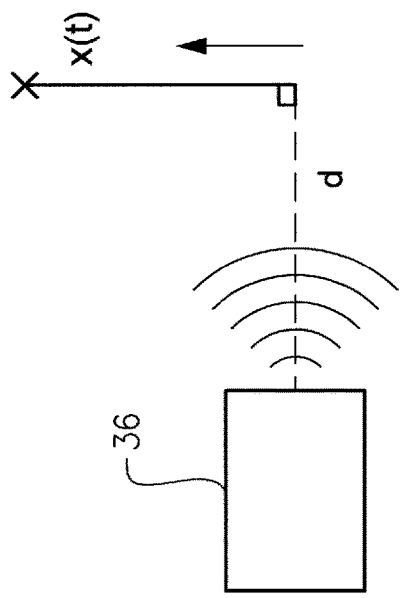
FIGS. 11a-11b illustrates paths of targets and their displacement with respect to a radar.
Figure 11B:
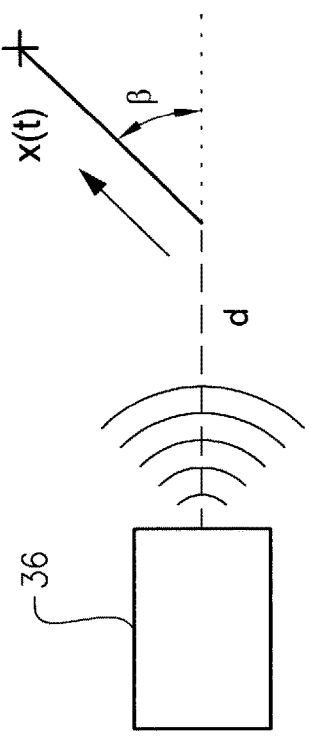

FIGS. 11*a* and 11*b* illustrate various paths of a target and its displacement with respect to a radar 36. This is a simplified version of the above calculations in conjunction with FIGS. 8 and 9.

In a simplified state of a Continuous Wave (CW) radar, the radar transmits a monotone signal s(t) with frequency $f_0$ in the form:

$$s(t)=\cos(2\pi f_0 t) \qquad (14)$$

Also assuming different straight path movements for target at initial distance d, a moving target in each case causes a phase shift $\Delta\emptyset$ to the transmitted signal from the radar. Thus, the return signal r(t) from the target has the form of:

$$r(t)=\cos(2\pi f_0 t + \Delta\emptyset) \qquad (15)$$

The phase shift, $\Delta\emptyset$, depends on the radial displacement from the radar, $\Delta d$, and is equal to:

$$\Delta\emptyset=2\pi\Delta d/\lambda \qquad (16)$$

Here $\lambda$ is the radar signal wavelength, $\lambda=c/f_0$ and for targets in each case in FIGS. 10*a*-10*c*, the displacement in a radial direction can be calculated.

FIG. 11*a* illustrates vertical movement in front of the radar. The displacement $\Delta d$ is then calculated as $$\Delta d=\sqrt{d^2+x^2(t)}-d \qquad (17)$$

where d is the initial distance from the radar and x(t) is the position of the target at time t with reference to the initial point, as seen in FIG. 11*a*. When the target is moving with a constant acceleration a, or a constant speed v, then we have:

$$x(t)=\tfrac{1}{2}at^2+vt \qquad (18)$$

FIG. 11*b* illustrates a case of linear movement with a slope of $\beta$ in relation to the radar line of sight. The displacement $\Delta d$ is then calculated as $$\Delta d=\sqrt{(d+x(t)\cos\beta)^2+(x(t)\sin\beta)^2}-d \qquad (19)$$

In the case of radial movement towards or away from radar, we have:

$$\Delta d=x(t)-d \qquad (20)$$

It is assumed that the target has either constant velocity or constant acceleration over short periods of observation time.

After down conversion, the returned signals will be in the form of:

$$y(t)=\cos(\Delta\emptyset)=\cos(2\pi\Delta d/\lambda) \qquad (21)$$

Generation of this signal for each movement pattern and playing them to the radar system in vehicle under test in FIG. 1 is equivalent to the observation of virtual targets in the corresponding situations by the radar.

Another example embodiment of the invention is application of radars for detecting the angle of target(s). By using the target scenario generator as described above, angular information can be represented for a VUT.

Radars can acquire angular information using two methods:
Steering a single beam antenna (either mechanically or electronically),
Using a multi-beam antenna.

Target scenario signal generation for both kinds of radars is explained here.

Single Steering Beam Radar:

In this case, which is the most common case, the radar's antenna has one single beam. This beam, which can be relating to the transmitter or receiver or both, is steered mechanically or electronically so that the entire detection range is scanned within a measurement cycle. At each steering angle, the radar perceives an amplitude and a phase that depend on the strength of the radar beam at the position of target. The target will be detected at an angle from which the radar receives the most powerful signal.

Figure 12B:
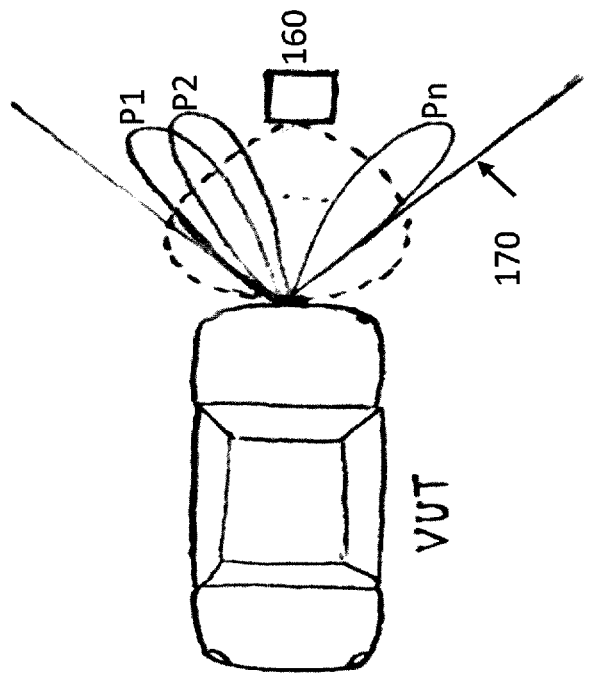
FIGS. 12a and 12b illustrates target scenario generation for single steering beam radar.
Figure 12A:
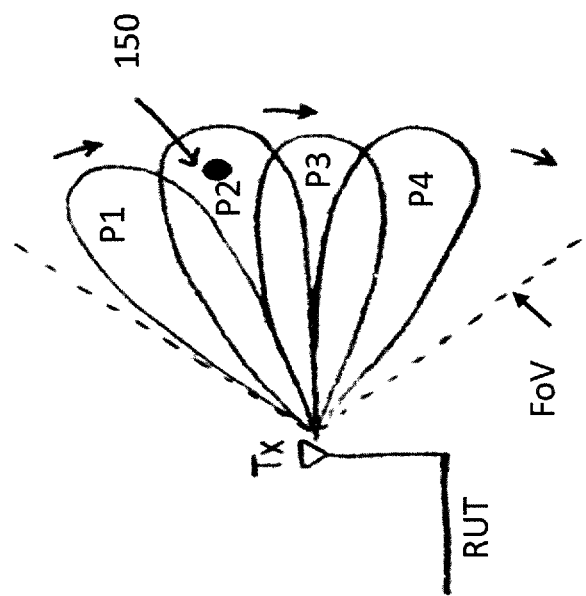

For example, consider a point target and a single beam radar that scans different directions. This is illustrated in FIGS. 12*a* and 12*b*. FIG. 12*a* comprises a radar under test RUT with a transmitter Tx. The radar has a FoV as illustrated by the dashed lines. The radar beam is shown to be moved between four different positions, positions P1-P4. A point target 150 is present within the detection range of the radar.

When the radar beam is in position P1 or P3, the radar receives less power compared with when it is in position P2. At position P2, the target is illuminated with the peak of the radar beam and the reflected signal is stronger. At position P4, the radar receives a very weak signal from the target through its antenna side lobes.

FIG. 12*b* shows the antenna beam (dashed lines) of a target scenario generator 160 positioned in front of a VUT with a single steering beam antenna. The different positions P1, P2 . . . Pn of the single steering beam antenna located on the VUT are indicated with whole lines. The vehicle has a field of view 170.

Target Simulation for a Single Steering Beam Radar:

To create the sensing of the angular position of a target for the single beam radar under test using the target scenario generator, we need to reproduce the same amplitude and phase which correspond to the target at each steering angle. Therefore, the signal generation is updated for each steering angle.

Here some assumptions are necessary:
The angular position of radar beam at any moment must be known, Radar antenna information including pattern, beam width, steering steps and detecting range should be known, RF front end of target scenario generator has a single wide beam for transmission and sits close to the VUT so that it covers the radar's scanning beam throughout whole detection range.

Following Scanning Beam Position:

The angular position of the radar beam will be acquired through the synchronization sub-system 208 described before. To do so, the receiver antenna 210 in the system 208 listens to the radar signal and measures the time interval between two peaks in the received signal power, i.e. the cycle of one full scan. Using this and the beam width, steering steps and detecting range information; it is possible to find the timing of steering and synchronize signal generation with the position of scanning beam.

Multi-Beam:

One approach to acquire angular information is using monopulse radars—radars with one transmit and two receive antennas that are placed a distance $\Gamma$ from each other with their beams being in slightly different directions. The received signals from the two antennas, with amplitudes of A1 and A2, are added ($A_\Sigma$) and subtracted ($A_\Delta$). The angular position θ of the target is worked out using the ratio of the amplitudes of the sum and difference signals, $A_\Sigma$ and $A_\Delta$, based on equation 22

$$\theta = \arcsin \frac{\arctan\left(\frac{A_\Sigma}{A_\Delta}\right)}{\pi \Gamma / \lambda}$$

Figure 13:
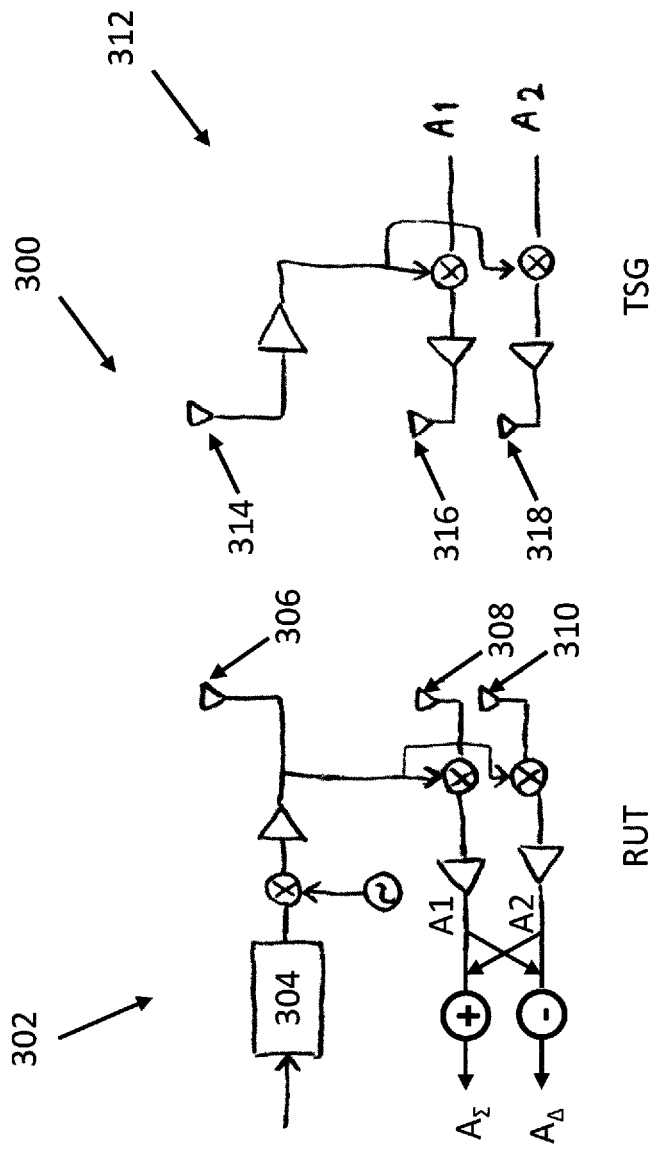
FIG. 13 illustrates an arrangement of antennas for simulation of angular information for monopulse radars.

Target Simulation for Monopulse Radar:

To simulate a target at a particular angular position for monopulse radars, two transmit antennas are required at the RF front-end of target scenario generator, see FIG. 13. FIG. 13 illustrates an arrangement 300 of antennas for simulation of angular information for monopulse radars. The arrangement 300 comprises a radar under test (RUT) 302 comprising a voltage controlled oscillator 304, a RUT transmitter antenna 306, a first RUT receiver antenna 308 and a second RUT receiver antenna 310. The arrangement further comprises a target scenario generator (TSG) 312 comprising a TSG receiving antenna 314, a first TSG transmitter antenna 316 and a second TSG transmitter antenna 318.

The amplitudes of the signals transmitted from these antennas should be proportional to A1 and A2, so that at the radar side, the expected angular position is obtained at each time instant.

Side Lobes:

The side lobes of a radar antenna can in some occasions influence a received radar signal noticeably. For instance, if the main lobe of a radar signal does not observe any considerable reflections, or does not observe a target at quite far distance, but there is a major radar reflector in close vicinity of the antenna side lobes, the radar signal might be more influenced by the reflections received from side lobes.

To simulate this effect in the target scenario generator, it needs to emulate the situation when there is a false target in the main beam of radar under test. Signal generation processing can then be carried out for the scenario with the consideration of a false target, according to the above description of signal generation.

Combination of Scenarios

As described above, two methods are used for scenario generation: analytical and record-and-play.

Sometimes it is practical to combine the generated scenarios from the analytical engine with elements from recorded databases. To obtain the target scenario signature of the new combined scenario, relevant reflector points in analytical signal generation step needs to be re-identified. This is possible because the recorded library is produced under controlled conditions where there is full knowledge about targets and/or scenarios.

As an example, consider a recorded vehicle being combined with a background that is graphically simulated in analytical library. With position information of the recorded vehicle in the simulated background, the reflector points in the background environment that would be occluded by vehicle and should be removed of signal generation calculations can be determined.

Other considerations about combination of analytical signature with recorded signature is about weighting signals of analytical engine and recorded signals to reach the appropriate level and summation of signals.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Further useful applications where generation of relevant simulated reflected radar signature corresponding to at least one target in a specific scenario are conceivable within the scope of the invention. Accordingly, the drawings and the description are to be regarded as illustrative in nature, and not restrictive.

The invention claimed is:

1. Method for testing and evaluating a response of an automotive radar system for a specific automotive safety scenario, wherein the method comprises:
    arranging at least one automotive radar in a hardware in the loop setup,
    generating a simulated reflected radar signature corresponding to at least one virtual target in a specific virtual scenario,
    receiving the simulated signature by the at least one automotive radar,
    evaluating a response of the automotive radar system by comparing an output from the automotive radar system with an expected output based on the simulated target signature,
    displaying one or more of: error in velocity, error in distance, misdetection of the at least one target and false alarms,
wherein the generated simulated reflected radar signature corresponding to at least one virtual target in a specific virtual scenario is generated from one or more of:
    a pre-recorded real reflected radar signature from at least one real target in a specific real scenario,
    an analytical representation of a radar target signature from at least one target in a specific virtual scenario,
    wherein the analytical representation is based on virtual target parameters of the virtual target in a specific virtual scenario and of virtual scenario parameters of the virtual specific scenario,
    continuously updating virtual scenario parameters based on decisions input of the vehicle under test, and
    generating a simulated reflected radar signature including instantaneous amplitude and instantaneous phase for a target moving along any arbitrary trajectory.

2. Method according to claim 1, wherein the specific virtual scenario comprises one or more of:

at least one virtual target,
clutter,
virtual environmental scenario conditions
virtual traffic scenario conditions.

3. Method according to claim 1, wherein the virtual target and the virtual scenario is selected through a graphical user interface.

4. Method according to claim 1, wherein the pre-recorded real reflected radar signature from a real target in a specific real scenario is generated by a processing unit by accessing pre-recorded real reflected radar signature databases.

5. Method according to claim 4, wherein the pre-recorded real reflected radar signature databases are created by recording real reflected radar signal with a radar recorder system, wherein the radar recorder system records real target data, real clutter data and real environmental scenario conditions and traffic scenario conditions and stores each data in a respective target data database, clutter data database and scenario conditions database.

6. Method according to claim 1, wherein the virtual target parameters are one or more of:
type of target including pedestrians, cyclists, cars, trucks, animals, motorcycles, construction vehicles, road signs, road obstacles,
target velocity, distance, angle or trajectory of movement,
target radar cross section (RCS), including the case of partial coverage of target by radar beam, and change in RCS over time.

7. Method according to claim 1, wherein the virtual scenario parameters are one or more of:
virtual environmental scenario conditions,
virtual traffic scenario conditions.

8. Method according to claim 7, wherein the virtual environmental scenario conditions are one or more of:
geographical maps
static objects in the virtual environment
weather conditions.

9. Method according to claim 1, wherein the method comprises:
providing 3-D graphical models and point clouds for reflecting radar rays for all physical elements in the specific virtual scenario.

10. Method according to claim 9, wherein extended object signatures are created from aggregating radar signatures of point targets in point clouds.

11. Method according to claim 1, wherein the method comprises:
identification of reflecting points and paths causing secondary reflections.

12. Method according to claim 1, wherein the simulated reflected radar signature is randomly selected based on specification of virtual target parameters, list of virtual scenarios and virtual scenario conditions.

13. Method according to claim 1, wherein the simulated reflected radar signature comprises a full continuous wave.

14. Method according to claim 1, wherein the method comprises:
adapting the simulated reflected radar signature based on changes in radar parameters.

15. Method according to claim 1, wherein the method comprises:
generating a simulated reflected radar signature that reflects angular position of the virtual target.

16. Method according to claim 1, wherein the method comprises:
generating a simulated reflected radar signature corresponding to at least one virtual target for a single steering beam radar.

17. Method according to claim 1, wherein the method comprises:
generating a scenario wherein radar reflection is mainly present in side lobes of the radar under test.

18. Method according to claim 1, wherein the method comprises:
combining virtual signatures from both a pre-recorded real reflected radar signature and an analytical representation of a radar target signature.

19. System for testing and evaluating a response of an automotive radar system for a specific automotive safety scenario, wherein the system comprises:
at least one automotive radar in a hardware in the loop setup,
an electronic computer unit connected to the at least one automotive radar,
an evaluation module for evaluating the performance of the radar-based safety system,
a graphical user interface,
a radar front end arranged to generate a simulated reflected radar signature corresponding to at least one virtual target in a specific virtual scenario,
wherein the generated simulated reflected radar signature corresponding to at least one virtual target in a specific virtual scenario is generated from one or more of:
a pre-recorded real reflected radar signature from at least one real target in a specific real scenario,
an analytical representation of a radar target signature from at least one virtual target in a specific virtual scenario,
wherein the analytical representation is based on virtual target parameters of the virtual target in a specific virtual scenario and of virtual scenario parameters of the virtual specific scenario,
continuously update virtual scenario parameters based on decisions input of the vehicle under test, and
generate a simulated reflected radar signature including instantaneous amplitude and instantaneous phase for a target moving along any arbitrary trajectory.

20. System according to claim 19, wherein the radar front end comprises a first receiver antenna arranged to receive a signal from the radar under test on the VUT, an amplifier, a mixer arranged to add the target scenario radar signature, and a transmit antenna arranged to transmit the simulated reflected radar signal for the VUT.

21. System according to claim 20, wherein the radar front end further comprises a synchronization sub-system comprising second receiver antenna arranged to receive radar signals from the VUT to detect changes in radar parameters.

22. System according to claim 19, wherein the system comprises a radar front end arranged to simulate a virtual target with angular information for single steering beam radar and/or monopulse radar.

23. System according to claim 22, wherein the radar front end arranged to simulate a virtual target with angular information for single steering beam radar is a radar front end comprising a synchronization sub-system.

24. System according to claim 22, wherein the radar front end arranged to simulate a virtual target with angular information for a monopulse radar comprising a target scenario generator (TSG) comprising a TSG receiving antenna, a first TSG transmitter antenna and a second TSG transmitter antenna.

25. System according to claim 19, wherein the specific virtual scenario comprises one or more of:
   at least one virtual target,
   clutter,
   virtual environmental scenario conditions
   virtual traffic scenario conditions.

26. System according to claim 19, wherein the pre-recorded real reflected radar signature from a real target in a specific real scenario is generated by a processing unit by accessing pre-recorded real reflected radar signature databases.

27. System according to claim 26, wherein the pre-recorded real reflected radar signature databases are created by recording real reflected radar signal with a radar recorder system, wherein the radar recorder system records real target data, real clutter data and real environmental scenario conditions and traffic scenario conditions and stores each data in a respective target data database, clutter data database and scenario conditions database.

28. System according to claim 1, wherein the analytical representation is based on virtual target parameters of the virtual target in a specific virtual scenario and of virtual scenario parameters of the specific virtual scenario.

29. System according to claim 28, wherein target parameters are one or more of:
   type of target including pedestrians, cyclists, cars, trucks, animals, motorcycles, construction vehicles, road signs, road obstacles,
   target velocity, distance, angle or trajectory of movement,
   target radar cross section (RCS), including the case of partial coverage of target by radar beam, and change in RCS over time.

30. System according to claim 28, wherein the virtual scenario parameters are one or more of:
   virtual environmental scenario conditions,
   virtual traffic scenario conditions.

31. System according to claim 1, wherein the simulated reflected radar signature is randomly selected based on specification of virtual target parameters, list of virtual scenarios and virtual scenario conditions.

32. System according to claim 1, wherein the simulated reflected radar signature comprises a full continuous wave.

33. System according to claim 19, wherein the system is arranged to combine virtual signatures from both a pre-recorded real reflected radar signature and an analytical representation of a radar target signature.

* * * * *